US009848354B2

(12) United States Patent
Rajaee et al.

(10) Patent No.: US 9,848,354 B2
(45) Date of Patent: Dec. 19, 2017

(54) SYSTEMS AND METHODS FOR UPLINK ACTIVITY MANAGEMENT

(71) Applicant: QUALCOMM Incorporated, San Diego, CA (US)

(72) Inventors: Amir Rajaee, San Diego, CA (US); Cheol Hee Park, San Diego, CA (US); Gang Xiao, San Diego, CA (US); Reza Shahidi, San Diego, CA (US); Muhammad Arif Munif, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 14/862,873

(22) Filed: Sep. 23, 2015

(65) Prior Publication Data

US 2017/0086094 A1    Mar. 23, 2017

(51) Int. Cl.
*H04W 28/02* (2009.01)
*H04L 12/851* (2013.01)
*H04W 76/02* (2009.01)
*H04W 72/04* (2009.01)
*H04W 72/12* (2009.01)
*H04W 88/06* (2009.01)
*H04W 52/38* (2009.01)

(52) U.S. Cl.
CPC ......... *H04W 28/0284* (2013.01); *H04L 47/24* (2013.01); *H04W 28/0278* (2013.01); *H04W 72/0466* (2013.01); *H04W 72/1215* (2013.01); *H04W 76/025* (2013.01); *H04W 76/026* (2013.01); *H04W 52/38* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 7,072,315 B1 | 7/2006 | Liu et al. | |
| 8,725,145 B2 | 5/2014 | Mutya et al. | |
| 8,825,091 B2 | 9/2014 | Lee et al. | |
| 2009/0040937 A1 | 2/2009 | Xhafa et al. | |
| 2012/0044880 A1* | 2/2012 | Sun | H04W 72/1242 370/329 |
| 2012/0071106 A1 | 3/2012 | Kadous et al. | |
| 2012/0071185 A1* | 3/2012 | Dayal | H04W 72/1221 455/509 |
| 2012/0207040 A1* | 8/2012 | Comsa | H04W 72/1215 370/252 |

(Continued)

OTHER PUBLICATIONS

International Search Report and Written Opinion—PCT/US2016/049049—ISA/EPO—Nov. 30, 2016.

*Primary Examiner* — Robert C Scheibel
(74) *Attorney, Agent, or Firm* — Foley & Lardner LLP

(57) ABSTRACT

Systems and methods are described herein for managing uplink communication activities of a wireless communication device associated with a first subscription and a second subscription. First, a trigger event related to de-sensing of the first subscription by the second subscription is detected. The wireless communication device refrains from requesting uplink (UL) grants for the second subscription from a network for the second subscription in response to detecting the trigger event.

26 Claims, 8 Drawing Sheets

(56) References Cited

U.S. PATENT DOCUMENTS

| | | | |
|---|---|---|---|
| 2013/0012135 A1* | 1/2013 | Ruohonen | H04B 1/406 |
| | | | 455/63.1 |
| 2013/0028201 A1* | 1/2013 | Koo | H04W 72/1215 |
| | | | 370/329 |
| 2013/0114436 A1 | 5/2013 | Dural et al. | |
| 2013/0272260 A1* | 10/2013 | Bitran | H04W 16/14 |
| | | | 370/329 |
| 2013/0331137 A1* | 12/2013 | Burchill | H04W 52/243 |
| | | | 455/501 |
| 2014/0213210 A1 | 7/2014 | Li et al. | |
| 2014/0243041 A1* | 8/2014 | Zhao | H04W 88/06 |
| | | | 455/552.1 |
| 2015/0057046 A1 | 2/2015 | Challa et al. | |
| 2015/0139015 A1 | 5/2015 | Kadous et al. | |

\* cited by examiner

SYSTEMS AND METHODS FOR UPLINK ACTIVITY MANAGEMENT

BACKGROUND

A wireless communication device, such as a mobile phone device or a smart phone, may include at least one Subscriber Identity Module (SIM). Each SIM may enable one or more subscriptions corresponding to Radio Access Technologies (RATs). Specifically, with respect to multi-SIM wireless communication devices, when all SIMs are active, the wireless communication device may be a Multi-SIM-Multi-Active (MSMA) wireless communication device. When one SIM in a Multi-SIM wireless communication device is active while the rest of the SIM(s) is/are standing by, the wireless communication device may be a Multi-SIM-Multi-Standby (MSMS) wireless communication device. The RATs may include, but not limited to, a Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Wideband Code Division Multiple Access (WCDMA), Long Term Evolution (LTE), High-Speed Downlink Packet Access (HSDPA), Time Division Synchronous Code Division Multi Access (TD-SCDMA) and the like), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network.

Uplink (UL) activities of one RAT subscription may de-sense (interfere/collide with) another subscription. In some cases, UL activities of a subscription can de-sense another subscription with higher priority, causing high degradation of UL performance of the de-sensed subscription. For example, GSM activities (e.g., call, paging, and/or the like) may de-sense a LTE subscription. In one non-limiting example, such a scenario can frequently occur in Dual-SIM-Dual-Active (DSDA) or other multi-SIM wireless communication devices with a single set of transmission hardware. The problem is exacerbated when the victim subscription has high priority and high activity. When de-sensing occurs, the aggressor subscription may be blanked (i.e., halt transmission) or have its power reduced (transmission power back off) to curb the de-sense on a higher priority subscription. The blanking and the power back-off may cause an increase in bit error rate for the aggressor subscription as detected by the network. Thus, high network penalty may be imposed by the network on the UL activities of the aggressor subscription when power back-off or blanking is used.

A Buffer Status Report (BSR) may indicate to a base station an amount of resources desired by the wireless communication device to transmit a corresponding amount of data at UL for a given subscription. Based on the BSR, the base station may allocate an appropriate amount of resources (i.e., UL grants) for the wireless communication device to transmit the data over the network associated with the subscription. Bit errors may occur when the wireless communication device is unable to transmit data at the corresponding allocated UL grants wireless communication device to blanking and/or power back-off.

When the bit error rate (e.g., the Block Error Rate (BLER)) for the wireless communication device as detected by the network is greater than a predetermined threshold, the network may penalize (the subscription of) the wireless communication device by allocating fewer resources. For example, the network may reduce the UL Modulation Coding Scheme (MCS) and/or reduce scheduling for the aggressor subscription. The penalizing effect may be aggregated as the de-sensing activity goes on because more penalty may be imposed as the wireless communication device continues to make bit errors wireless communication device to blanking/power back-off of the aggressor subscription. This is especially pronounced in the networks with no Discontinuous Transmission (DTX) detection features or with limited UL resources (e.g., in Time-Division Duplexing (TDD) networks). DTX detection-enabled networks do not consider blanked UL activities at UL grants as a bit error.

SUMMARY

Various embodiments relate to scheduling and managing uplink (UL) activities in a wireless communication device having a plurality of Subscriber Identity Modules (SIMs). In particular, a Buffer Status Report (BSR) throttling process may be implemented for the wireless communication device. For example, the wireless communication device may manipulate the BSR to not request UL grants from the base station.

In some embodiments, a method for managing uplink communication activities of the wireless communication device associated with a first subscription and a second subscription is described. First, a trigger event related to de-sensing of the first subscription by the second subscription is detected. The UL grants are not requested for the second subscription from a network for the second subscription in response to detecting the trigger event.

In some embodiments, a method for managing uplink communication activities of a wireless communication device associated with a first subscription and a second subscription, the method includes, but not limited to, detecting a trigger event related to de-sensing of the first subscription by the second subscription; and refraining from requesting uplink (UL) grants for the second subscription from a network for the second subscription in response to detecting the trigger event.

In some embodiments, the trigger event is at least one of: detecting UL activities of the first subscription, detecting blanking of the second subscription, detecting power back-off of the second subscription, or detecting network penalties for the second subscription.

In various embodiments, the trigger event is the trigger event is a transmission blanking yield rate of the second subscription being above a predetermined threshold.

In some embodiments, the transmission blanking yield rate is determined by dividing a number of blocks blanked by a number of blocks scheduled for a Physical uplink Shared Channel (PUSCH).

In various embodiments, the method further includes determining the transmission blanking yield rate for a predetermined throttling window.

In some embodiments, the trigger event is an average UL Modulation Coding Scheme (MCS) for the second subscription being less than a predetermined threshold.

According to some embodiments, the average UL MCS for the second subscription being less than the predetermined threshold is the trigger event when an average Reference Signal Received Power (RSRP) with respect to the second subscription is greater than a predetermined threshold.

According to some embodiments, the method further includes determining the average UL MCS for a predetermined throttling window.

In some embodiments, refraining from requesting UL grants for the second subscription from the network for the second subscription in response to detecting the trigger event includes transmitting a Buffer Status Report (BSR) to the network for the second subscription without an UL grant request.

In some embodiments, the BSR includes at least one of a Signal Radio Bearer (SRB) signal, Non-Access Stratum (NAS) signal, or Acknowledgement (ACK)/Negative Acknowledgment (NACK) for Downlink (DL) Radio Link Control (RLC) and Transmission Control Protocol (TCP).

In some embodiments, activities of the first subscription have a higher priority than a priority of activities of the second subscription.

According to various embodiments, the method further includes determining whether activities of the first subscription have ended and transmitting a BSR to the network for the second subscription in response to determining that the activities of the first subscription have ended. The BSR includes an UL grant request.

According to various embodiments, the method further includes detecting a transmission blanking yield rate of the second subscription is above a predetermined threshold and periodically requesting UL grants for the second subscription using the BSR during activities of the first subscription when the transmission blanking yield rate of the second subscription is above a predetermined threshold.

According to various embodiments, the method further includes detecting an average UL MCS for the second subscription is less than a predetermined threshold and periodically requesting UL grants for the second subscription using the BSR during activities of the first subscription when the average UL MCS for the second subscription is less than a predetermined threshold.

According to some embodiments, a wireless communication device includes at least one radio frequency (RF) resource and a processor coupled to the at least one RF resource, configured to connect to a first SIM associated with a first subscription and to a second SIM associated with a second subscription. The processor is configured with processor-executable instructions to detect a trigger event related to de-sensing of the first subscription by the second subscription and refrain from requesting UL grants for the second subscription from a network for the second subscription in response to detecting the trigger event.

In some embodiments, the trigger event is at least one of detecting UL activities of the first subscription, detecting blanking of the second subscription, detecting power back-off of the second subscription, or detecting network penalties for the second subscription.

According to various embodiments, the trigger event is a transmission blanking yield rate of the second subscription being above a predetermined threshold.

According to various embodiments, the processor is configured with processor-executable instructions to determine the transmission blanking yield rate by dividing a number of blocks blanked by a number of blocks scheduled for a PUSCH.

According to various embodiments, the processor is configured with processor-executable instructions to determine the transmission blanking yield rate for a predetermined throttling window.

According to various embodiments, the trigger event is an average UL MCS for the second subscription being less than a predetermined threshold.

According to various embodiments, the processor is configured with processor-executable instructions to determine the average UL MCS for the second subscription being less than the predetermined threshold by determining an average RSRP with respect to the second subscription is greater than a predetermined threshold.

According to various embodiments, the processor is configured with processor-executable instructions to determine the average UL MCS for a predetermined throttling window.

According to various embodiments, refraining from requesting UL grants for the second subscription from the network for the second subscription in response to detecting the trigger event includes transmitting a BSR to the network for the second subscription without an UL grant request.

According to various embodiments, the BSR includes at least one of a SRB signal, NAS signal, or ACK/NACK for DL RLC and TCP.

According to various embodiments, the activities of the first subscription have a higher priority than a priority of activities of the second subscription.

According to various embodiments, the processor is further configured with processor-executable instructions to determine whether activities of the first subscription have ended, and transmit a BSR to the network for the second subscription in response to determining that the activities of the first subscription have ended. The BSR includes an UL grant request.

According to various embodiments, the processor is further configured with processor-executable instructions to detect a transmission blanking yield rate of the second subscription is above a predetermined threshold and periodically request UL grants for the second subscription using the BSR during activities of the first subscription when the transmission blanking yield rate of the second subscription is above a predetermined threshold.

According to various embodiments, the processor is further configured with processor-executable instructions to detect an average UL MCS for the second subscription is less than a predetermined threshold and periodically request UL grants for the second subscription using the BSR during activities of the first subscription when the average UL MCS for the second subscription is less than a predetermined threshold.

In some embodiments, a system for managing uplink communication activities of a wireless communication device associated with a first subscription and a second subscription, includes means for detecting a trigger event related to de-sensing of the first subscription by the second subscription and means for refraining from requesting UL grants for the second subscription from a network for the second subscription in response to detecting the trigger event.

According to various embodiments, a non-transitory computer-readable medium containing computer-readable instructions such that, when executed, causes a processor of a wireless communication device to execute a method for managing uplink communication activities of the wireless communication device associated with a first subscription and a second subscription, the method including detecting a trigger event related to de-sensing of the first subscription by the second subscription and refraining from requesting uplink (UL) grants for the second subscription from a network for the second subscription in response to detecting the trigger event.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

DETAILED DESCRIPTION

Figure 1:
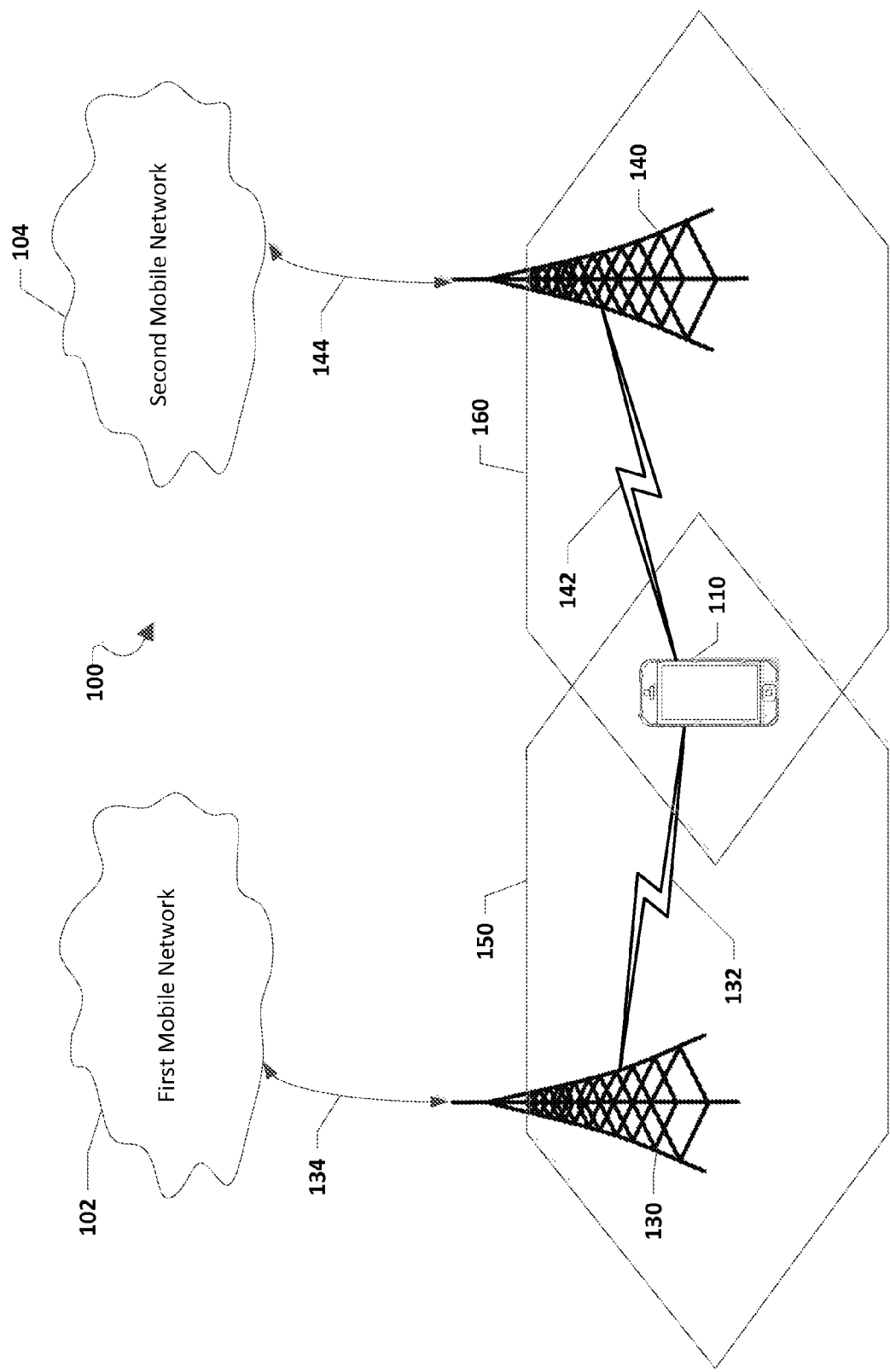
FIG. 1 is a schematic diagram of a communication system in accordance with various embodiments.

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Some modern communication devices, referred to herein as a wireless communication device or mobile station (MS), may include any one or all of cellular telephones, smart phones, personal or mobile multi-media players, personal data assistants, laptop computers, personal computers, tablet computers, smart books, palm-top computers, wireless electronic mail receivers, multimedia Internet-enabled cellular telephones, wireless gaming controllers, and similar personal electronic devices. Such devices may include at least one subscriber identity modules (SIM), a programmable processor, memory, and circuitry for connecting to two or more mobile communication networks simultaneously.

A wireless communication device may include one or more SIMs that provide users of the wireless communication devices with access to one or multiple separate mobile communication networks. The mobile communication networks are supported by radio access technologies (RATs). Examples of wireless communication devices include, but are not limited to, mobile phones, laptop computers, smart phones, and other mobile communication devices of the like that are configured to connect to one or more RATs. Examples of RATs include, but are not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Wideband Code Division Multiple Access (WCDMA), Long Term Evolution (LTE), High-Speed Downlink Packet Access (HSDPA), and the like), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network. Each RAT may be associated with at least one subscription.

A wireless communication device provided with a plurality of SIMs and connected to two or more separate (or same) RATs with one RAT subscription being active at a given time is a multi-SIM-multi-standby (MSMS) communication device. In one example, the MSMS communication device may be a dual-SIM-dual-standby (DSDS) communication device, which may include two SIM cards/RATs that may both be active on standby, but one is deactivated when the other one is in use. In another example, the MSMS communication device may be a triple-SIM-triple-standby (TSTS) communication device, which includes three SIM cards/RATs that may all be active on standby, where two may be deactivated when the third one is in use. In other examples, the MSMS communication device may be other suitable multi-SIM communication devices, with, for example, four or more SIMs, such that when one is in use, the others may be deactivated.

A wireless communication device includes a plurality of SIMs and connects to two or more separate (or same) RATs with two or more RATs being active at a given time. An example MSMA communication device is a dual-SIM-dual-active (DSDA) communication device, which includes two SIM cards/RATs. Both SIMs may remain active. In another example, the MSMA device may be a triple-SIM-triple-active (TSTA) communication device, which includes three SIM cards/RATs. All three SIMs may remain active. In other examples, the MSMA communication device may be other suitable multi-SIM communication devices with four or more SIMs, for which that all SIMs may be active.

Generally, embodiments described herein may be applicable to any device in which a second subscription experiences power back-off or blanking wireless communication device to activities of a first subscription. The wireless communication device may implement the power back-off and the blanking because the second subscription may de-sense the high-priority activates of the first subscription. In some embodiments, embodiments described herein may be implemented for the MSMA wireless communication devices, in which two or more subscription may share a single set of transmission hardware. In addition, the embodiments described herein may also be implemented with MSMA wireless communication devices having two or more subscriptions that share two or more sets of transmission hardware, when power back-off or blanking is imposed on the second subscription.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the wireless device to establish a communication link for a particular communication service with a particular network, the term "SIM" may also be used herein as a shorthand reference to the communication service associated with and enabled by the information (e.g., in the form of various parameters) stored in a particular SIM as the SIM and the communication network, as well as the services and RATs supported by that network, correlate to one another.

Systems and methods for UL activity management in de-sense scenarios are described herein. A wireless communication device may include a scheduling module, which may include hardware (i.e., processor and memory) and software for scheduling UL activity of two or more RAT subscriptions. In particular, the scheduling module may determine the BSR to be transmitted to the network. The network may be supported by one or more BSs. Generally, a BSR throttling process may be implemented to reduce the effect of the penalties and to increase performance for the aggressor subscription (i.e., a second subscription) of a multi-SIM wireless communication device.

The first subscription (e.g., GSM) may be de-sensed by activities of a second subscription (e.g., LTE). The scheduling module may determine whether a trigger event has occurred. The scheduling module may monitor for the trigger event within a predefined throttling window (e.g., 400 ms). The trigger event may be related to the performance of the second subscription. In particular, when the trigger event has occurred, the performance of the second subscription may be deemed to have reached an intolerable level.

In some embodiments, the trigger event may include detecting UL activities of the first subscription. The UL activities of the first (victim) subscription may be associated with a higher priority than the UL activities of the second (aggressor) subscription. Illustrating with a non-limiting example, activities of the LTE subscription may de-sense activities of the GSM call or page. In other embodiments, the trigger event may include one or more or all of (1) a transmission blanking yield rate of the second subscription crosses a predetermined threshold; and/or (2) an average UL Modulation Coding Scheme (MCS) for the second subscription is less than a predetermined threshold (when an Average Reference Signal Received Power (RSRP) with respect to the second subscription is greater than a predetermined threshold).

The transmission blanking yield rate may be equal to a number of blocks blanked divided by a number of total blocks scheduled for a Physical uplink Shared Channel (PUSCH). Therefore, the higher the number of blocks blanked, the higher the transmission yield blanking rate for the second subscription may be. Illustrating with a non-limiting example, the predetermined threshold of the transmission blanking yield rate may be 0.15. An example of the predetermined RSRP threshold may be −100 dBm. A non-limiting example of the MCS threshold may be 10. Other RSRP and MCS thresholds may be used.

In response to detecting the trigger event, the scheduling module may set the BSR such that the wireless communication device does not request any UL grants from the network. In particular, the scheduling module may avoid requesting UL grants from the network by not including UL grant requests in the BSR after the throttling window closes. Accordingly, the network may not allocate any UL grants for the second subscription, given that the wireless communication device has requested none. Therefore, the BLER with respect to the wireless communication device for the second subscription may decrease as no UL grants were assigned by the network to the wireless communication device. The scheduling module may include one or more or all of Signal Radio Bearer (SRB) signals, Non-Access Stratum (NAS) signals, Acknowledgement (ACK) signals, or Negative Acknowledgment (NACK) signals for Downlink (DL) Radio Link Control (RLC) and Transmission Control Protocol (TCP) in the BSR. These signals may be included in the BSR given that they are not related to UL grants.

In some embodiments, the scheduling module may determine whether the second subscription has been blanked or has its power backed off completely for the throttling window. In response to detecting complete de-sense, the scheduling unit may halt transmission activities for the first subscription so that the second subscription may transmit UL data. In particular embodiments, the scheduling module may schedule UL grants for the second subscription (as manipulated by the BSR) periodically (e.g., once every 10 ms) in response to detecting complete blanking or power back-off within the throttling window.

Various embodiments may be implemented within a communication system 100, an example of which is illustrated in FIG. 1. A first mobile network 102 and a second mobile network 104 typically each may include a plurality of cellular base stations, such as, but not limited to, a first base station 130 and a second base station 14, respectively). The first base station 130 may broadcast the first mobile network 102 in a first serving cell 150. The second base station 140 may broadcast the second mobile network 104 in a second serving cell 160. A wireless communication device 110 may be associated with the first serving cell 150, the second serving cell 160, or both.

The wireless communication device 110 may be in communication with the first mobile network 102 through a first cellular connection 132 to the first base station 130. The first cellular connection 132 may correspond to a first RAT subscription of the wireless communication device 110. The wireless communication device 110 may also be in communication with the second mobile network 104 through a second cellular connection 142 to the second base station 140. The second cellular connection 142 may correspond to a second RAT subscription of the wireless communication device 110, as in a multi-SIM context. The first base station 130 may be in communication with the first mobile network 102 over a wired or wireless connection 134. The second base station 140 may be in communication with the second mobile network 104 over a wired or wireless connection 144.

The first cellular connection 132 and the second cellular connection 142 may be made through two-way wireless communication links. Each of the wireless communication links may be enable by FDMA, TDMA, CDMA (e.g., EVDO), UMTS (e.g., WCDMA, LTE, HSDPA, TD-SCDMA, or the like), GSM, 1×, GPRS, Wi-Fi, PCS, and/or another protocol used in a wireless communications network or a data communications network. By way of illustrating with a non-limiting example, the first cellular connection 132 may be a GSM connection. In further embodiments, the first cellular connection may be an 1× connection, TD-SCDMA connection, WCDMA connection, LTE connection, or the like. The second cellular connection 142 may be a LTE connection. Other RAT subscriptions (e.g., WCDMA, HSDPA, EVDO, 1×, and the like) may be implemented in a similar manner. In some embodiments, the first cellular connection 132 and the second cellular connection 142 may each be associated with a different RAT. In other embodiments, the first cellular connection 132 and the second cellular connection 142 may be associated with a same RAT (though the subscriptions may be different).

Each of the first base station 130 and the second base station 140 may include at least one antenna group or transmission station located in the same or different areas.

The at least one antenna group or transmission station may be associated with signal transmission and reception. Each of the first base station 130 and the second base station 140 may include one or more processors, modulators, multiplexers, demodulators, demultiplexers, antennas, and the like for performing the functions described herein. In some embodiments, the first base station 130 and the second base station 140 may be an access point, Node B, evolved Node B (eNodeB or eNB), base transceiver station (BTS), or the like.

In various embodiments, the wireless communication device 110 may be configured to access the first mobile network 102 and the second mobile network 104 by virtue of the multi-SIM and/or the multi-mode SIM configuration of the wireless communication device 110 (e.g., via the first cellular connection 132 and the second cellular connection 142). When a SIM corresponding to a RAT is received, the wireless communication device 110 may access the mobile communication network associated with that RAT based on the information stored on the SIM.

While the wireless communication device 110 is shown connected to the mobile networks 102 and 104 via two cellular connections, in other embodiments (not shown), the wireless communication device 110 may establish additional network connections associated in a manner similar to those described herein.

In some embodiments, the wireless communication device 110 may establish a wireless connection with a peripheral device (not shown) used in connection with the wireless communication device 110. For example, the wireless communication device 110 may communicate over a Bluetooth® link with a Bluetooth-enabled personal computing device (e.g., a "smart watch"). In some embodiments, the wireless communication device 110 may establish a wireless connection with a wireless access point (not shown), such as over a Wi-Fi connection. The wireless access point may be configured to connect to the Internet or another network over a wired connection.

While the communication system 100 is illustrated with two mobile networks 102, 104 for multi-SIM wireless communication devices, one of ordinary skill in the art would appreciate that the communication system 100 (in embodiments not shown) may include one mobile network (i.e., only the first mobile network 102 for the single-SIM wireless communication devices) or three or more mobile networks. Each of the mobile networks may be a network such as, but not limited to, the first mobile network 102 or the second mobile network 104.

Figure 2:
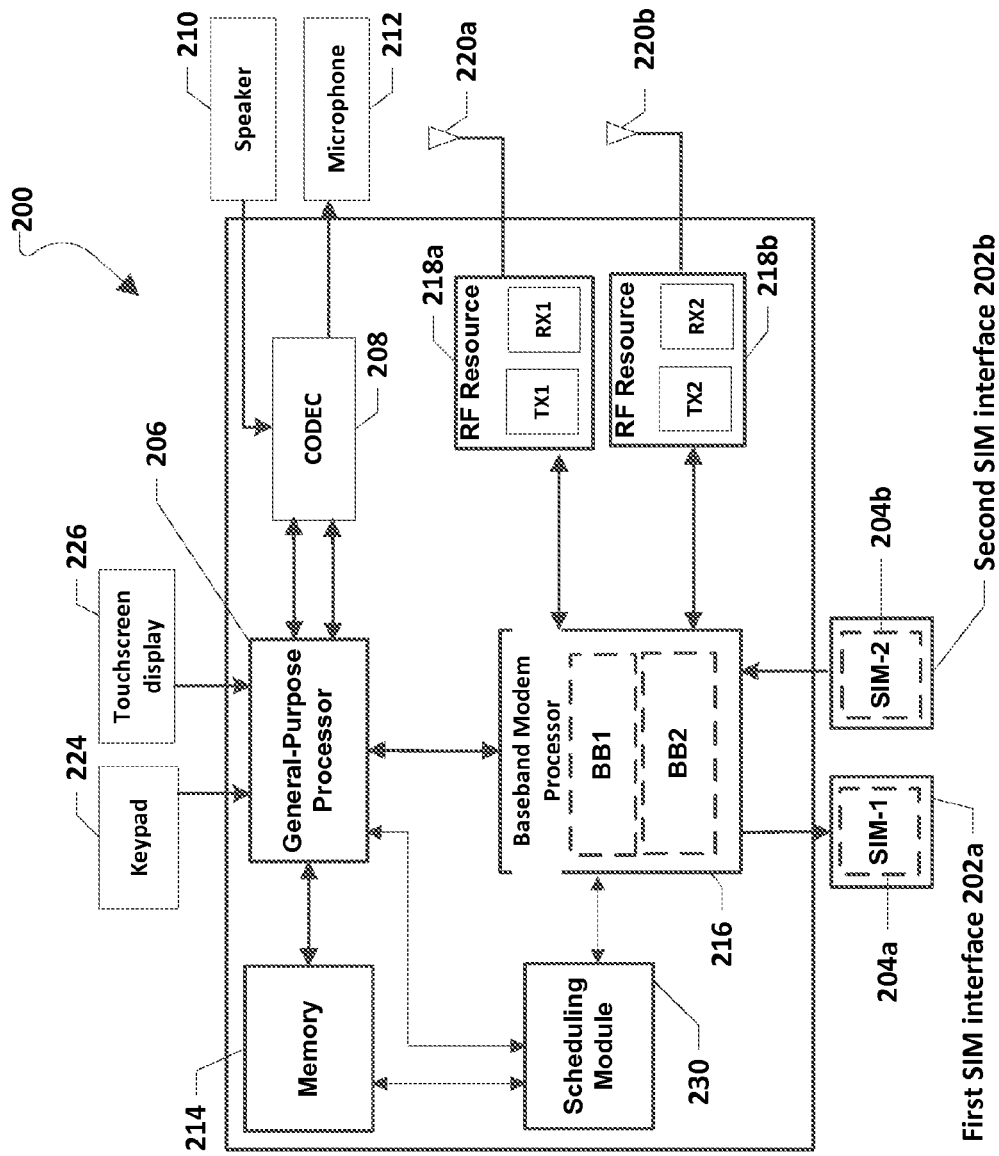
FIG. 2 is a component block diagram of an example of a wireless communication device according to various embodiments.

FIG. 2 is a functional block diagram of a wireless communication device 200 suitable for implementing various embodiments. According to various embodiments, the wireless communication device 200 may be the wireless communication device 110 as described with reference to FIG. 1. Referring to FIGS. 1-2, the wireless communication device 200 may include a first SIM interface 202*a*, which may receive a first identity module SIM-1 204*a* that is associated with the first RAT subscription. The wireless communication device 200 may also include a second SIM interface 202*b*, which may receive a second identity module SIM-2 204*b* that is associated with the second RAT subscription. In some embodiments, the first RAT may be different from the second RAT. In other embodiments, the first RAT may be a same RAT as the second RAT.

A SIM in various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA Subscriber Identity Module (CSIM) on a card. A SIM card may have a Central Processing Unit (CPU), Read Only Memory (ROM), Random Access Memory (RAM), Electrically Erasable Programmable Read-Only Memory (EEPROM) and Input/Output (I/O) circuits. An Integrated Circuit Card Identity (ICCID) SIM serial number may be printed on the SIM card for identification. However, a SIM may be implemented within a portion of memory of the wireless communication device 200, and thus need not be a separate or removable circuit, chip, or card.

A SIM used in various embodiments may store user account information, an IMSI, a set of SIM Application Toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home PLMN (HPLMN) code, etc.) to indicate the SIM card network operator provider.

The wireless communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The general-purpose processor 206 may include any suitable data processing device, such as a microprocessor. In the alternative, the general-purpose processor 206 may be any suitable electronic processor, controller, microcontroller, or state machine. The general-purpose processor 206 may also be implemented as a combination of computing devices (e.g., a combination of a Digital Signal Processor (DSP) and a microprocessor, a plurality of microprocessors, at least one microprocessor in conjunction with a DSP core, or any other such configuration).

The memory 214 may be a non-transitory processor-readable storage medium that stores processor-executable instructions. For example, the instructions may include routing communication data relating to the first or second subscription though a corresponding baseband-RF resource chain. The memory 214 may include any suitable internal or external device for storing software and data. Examples of the memory 214 may include, but are not limited to, RAM, ROM, floppy disks, hard disks, dongles or other Recomp Sensor Board (RSB) connected memory devices, or the like. The memory 214 may store an Operating System (OS), user application software, and/or executable instructions. The memory 214 may also store application data, such as an array data structure.

The general-purpose processor 206 and the memory 214 may each be coupled to at least one baseband modem processor 216. Each SIM in the wireless communication device 200 (e.g., the SIM-1 204*a* and/or the SIM-2 204*b*) may be associated with a baseband-RF resource chain. A baseband-RF resource chain may include the baseband modem processor 216, which may perform baseband/modem functions for communications on at least one SIM. The baseband modem processor 216 may include one or more amplifiers and radios, referred to generally herein as RF resources 218*a*, 218*b* (e.g., the first RF resource 218*a* and the second RF resource 218*b*). In some embodiments, baseband-RF resource chains may share the baseband modem processor 216 (i.e., a single device that performs baseband/ modem functions for all SIMs on the wireless communication device 200). In other embodiments, each baseband-RF resource chain may include physically or logically separate baseband processors (e.g., BB1, BB2). Alternatively, one baseband-RF resource chain may be shared by two or more of the subscriptions enabled by the SIMs 204a, 204b.

Embodiments described herein may be implemented for other types of wireless communication devices where the first subscription may be de-sensed by the second subscription. For example, the embodiments described herein may be applicable to wireless communication devices in which the first and second subscriptions share a common set of RF resources (particularly, transmission resources for UL). Embodiments described herein may also be applicable to wireless communication devices in which the first and second subscriptions each has a separate set of RF resources (particularly, transmission resources for UL), but activities of the second subscription may nevertheless de-sense (e.g., interfere with) the first subscription so as to justify blanking or power back-off of the second subscription.

The RF resources 218a, 218b may each be transceivers that perform transmit/receive functions for the associated SIMs 204a, 204b of the wireless communication device 200. The RF resources 218a, 218b may include separate transmit and receive circuitry, or may include a transceiver that combines transmitter and receiver functions. The RF resources 218a, 218b may each be coupled to a wireless antenna (e.g., a first wireless antenna 220a or a second wireless antenna 220b). The RF resources 218a, 218b may also be coupled to the baseband modem processor 216.

In some embodiments, the general-purpose processor 206, the memory 214, the baseband modem processor 216, and the RF resources 218a, 218b may be included in the wireless communication device 200 as a system-on-chip. In some embodiments, the first and second SIMs 202a, 202b and their corresponding interfaces 204a, 204b may be external to the system-on-chip. Further, various input and output devices may be coupled to components on the system-on-chip, such as interfaces or controllers. Example user input components suitable for use in the wireless communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the wireless communication device 200 to enable communication between them, as is known in the art.

The wireless communication device 200 may include a scheduling module 230 configured to manage and/or schedule activities of the first and the second subscriptions. For example, the scheduling module 230 be configured perform the processes described herein with respect to communications of UL traffic.

In some embodiments, the scheduling module 230 may be implemented within the general-purpose processor 206. For example, the scheduling module 230 may be implemented as a software application stored within the memory 214 and executed by the general-purpose processor 206. Accordingly, such embodiments can be implemented with minimal additional hardware costs. However, other embodiments relate to systems and processes implemented with dedicated hardware specifically configured for performing operations described herein with respect to the scheduling module 230. For example, the scheduling module 230 may be implemented as a separate hardware component (i.e., separate from the general-purpose processor 206). The scheduling module 230 may be coupled to the memory 214, the general processor 206, the baseband processor 216, and/or the RF resources 218a, 218b for performing the function described herein.

Hardware and/or software for the functions may be incorporated in the wireless communication device 200 during manufacturing, for example, as a part of a configuration of an original equipment manufacturer (OEM) of the wireless communication device 200. In further embodiments, such hardware and/or software may be added to the wireless communication device 200 post-manufacture, such as by installing one or more hardware devices and/or software applications onto the wireless communication device 200.

In various embodiments, the wireless communication device 200 may include, among other things, additional SIM cards, SIM interfaces, a plurality of RF resources associated with the additional SIM cards, and additional antennas for connecting to additional mobile networks. In various embodiments, the wireless communication device 200 may include one baseband RF resource chain when the wireless communication device 200 includes one SIM. For example, a single-SIM wireless communication device may be the wireless communication device 200 without the second SIM interface 202b, the SIM-2 204b, the second RF resource 218b, and/or the second wireless antenna 220b.

Figure 3:
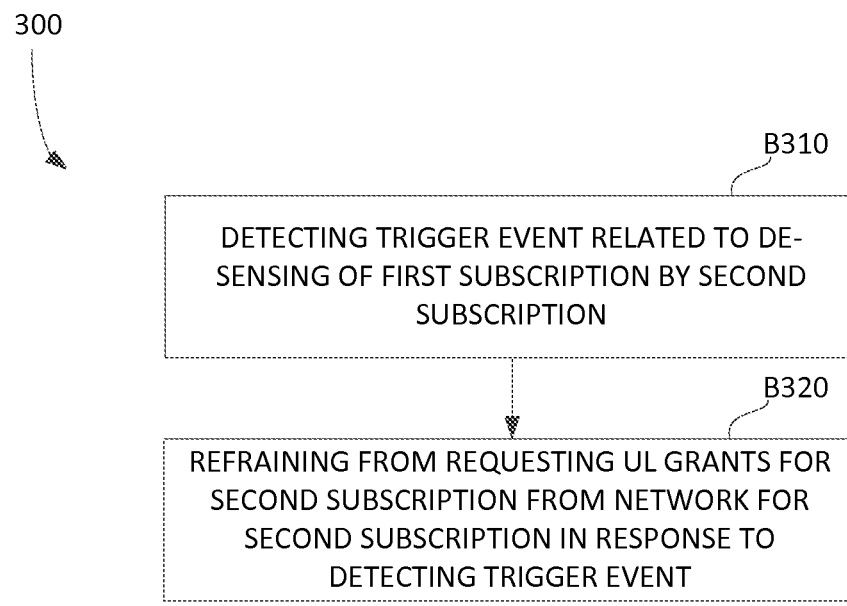
FIG. 3 is a process flowchart diagram illustrating an example of a scheduling method according to various embodiments.

FIG. 3 is a process flowchart diagram illustrating an example of a scheduling method 300 according to various embodiments. Referring to FIGS. 1-3, the scheduling method 300 may be implemented by the scheduling module 230 according to some embodiments. At block B310, the scheduling module 230 may detect a trigger event related to de-sensing of the first subscription by the second subscription. In some embodiments the first subscription may be a GSM subscription. The second subscription may be an LTE subscription. When high-priority activities (e.g., a voice call or a page) of the first subscription have been initialized, the scheduling module 230 may initiate management, such as a reduction (e.g., blanking or power back-off). In other words, the trigger event may be related to detecting a reduction or expected reduction of activities of the second subscription wireless communication device to high-priority activities of the first subscription.

In some embodiments, the trigger event may be a blanking of the second subscription exceeding a predetermined tolerance level (as shown in the transmission blanking yield rate as described herein). In some embodiments, the trigger event may be the average UL MCS for the second subscription being less than a predetermined threshold (when the average RSRP with respect to the second subscription is greater than a predetermined threshold). In some embodiments, the trigger event may be detecting (by the scheduling module 230) the activities (e.g. a voice call or page) of the first subscription. In some embodiments, the trigger event may be other suitable indication that the activities of the first subscription has been initiated, that the second subscription has or is expected to suffer blanking and/or power back-off, and/or that the second subscription has or is expected to suffer network penalties.

At block B320, the scheduling module 230 may refrain from requesting UL grants for the second subscription from the second mobile network 104 (for the second subscription) in response to detecting the trigger event. In particular, the BSR transmitted to the second base station 140 by the scheduling module 230 may omit or otherwise not include any requests for UL grants. This is known as BSR throttling. The throttled BSR may nevertheless include signaling messages such as, but not limited to, the SRB/NAS signals, ACK/NACK signals DL RLC and TCP, and/or the like. As described with respect to block B310, the trigger event may be particularly related to effects on the second (aggressor) subscription wireless communication device to the response when the second subscription has or is expected to de-sense the first subscription. By not requesting UL grants from the second mobile network 104 for the second subscription during activities of the first subscription, the second mobile network 104 would not need to penalize the wireless communication device 200 for not using the UL grants requested for blanking and power back-off.

Figure 4:
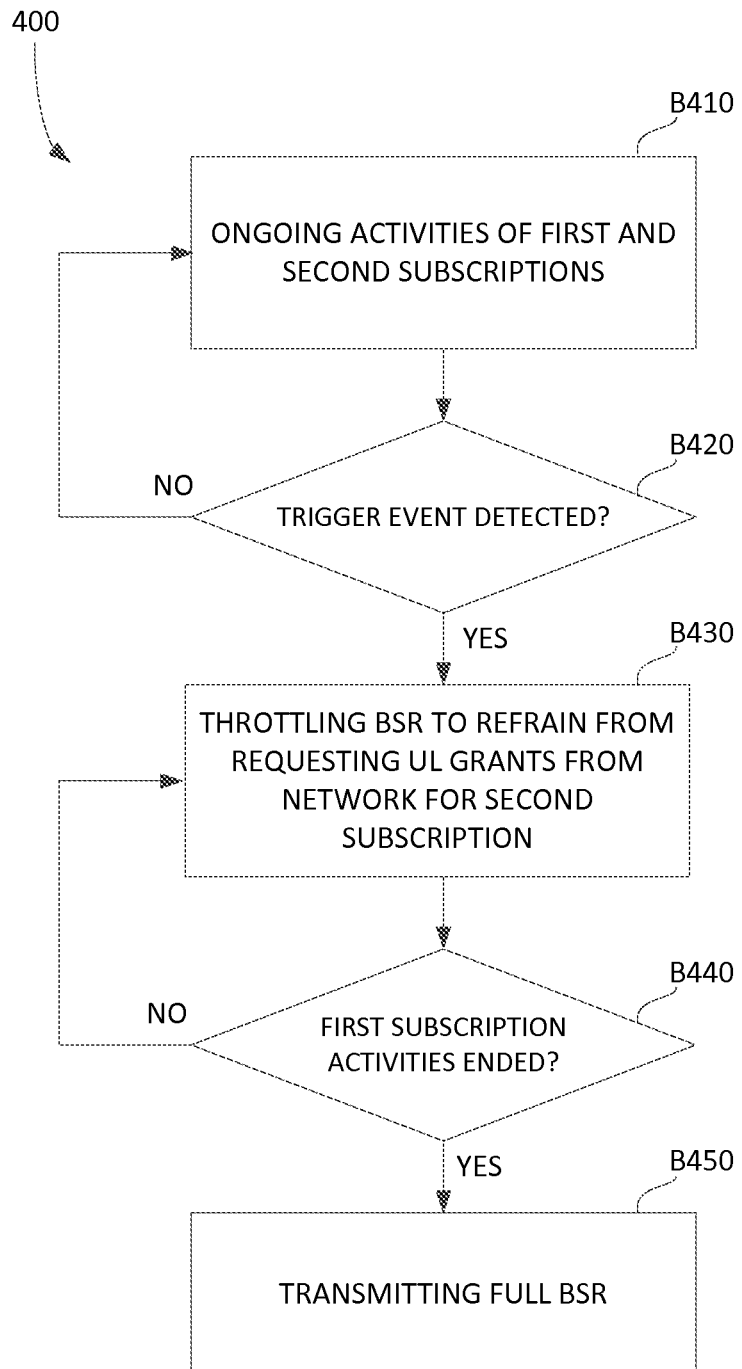
FIG. 4 is a process flowchart diagram illustrating an example of a scheduling method according to various embodiments.

FIG. 4 is a process flowchart diagram illustrating an example of a scheduling method 400 according to various embodiments. Referring to FIGS. 1-4, the scheduling method 400 may be particular embodiments of the scheduling method 300. For instance, each of blocks B310 and B320 may correspond to one or more blocks of the scheduling method 400. At block B410, the wireless communication device 200 may be engaged in ongoing activities on both the first and second subscriptions.

At block B420, the scheduling module 230 may detect whether the trigger event has been detected. A non-limiting example of the trigger event may be the scheduling module 230 detecting that the transmission blanking yield rate ($R_{txb}$) is above the predetermined threshold ($R_{th}$). The transmission blanking yield rate may be calculated with:

$$R_{txb} = \frac{N_{txb}}{N_{sc}} \quad (1)$$

where $N_{txb}$ is the number of transmission blocks blanked, and $N_{sc}$ is the number of total blocks scheduled for the PUSCH. $N_{txb}$ and $N_{sc}$ may be monitored for a predetermined amount of time (i.e., a throttling window) and/or for a predetermined $N_{sc}$. The throttling window may be, for example, but not limited to 100 ms, 200 ms, 400 ms, 500 ms, or the like. The predetermined $N_{sc}$ may be, for example, but not limited to 50, 100, 200, 300, or the like. The $R_{th}$ may be for example, but not limited to 10%, 15%, 20%, 30%, or the like. At the close of the throttling window and/or after the predetermined $N_{sc}$ has been communicated or blanked, the $R_{txb}$ may be determined.

Another non-limiting example of the trigger event may be the scheduling module 230 detecting that the average MCS ($MCS_{avg}$) is below a predetermined threshold ($MCS_{th}$). MCS is a physical layer element. The MCS may be monitored for the throttling window. Then, $MCS_{avg}$ may be determined for the MCS values obtained within the throttling window. In some embodiments, the MCS is used as the trigger event conditioned upon the average RSRP being greater than or equal to a predetermined amount (e.g., but not limited to, −50 dBm, −100 dBm, −150 dBm, or the like). The $MCS_{th}$ may have values such as, but not limited to, 5, 8, 10, 12, 14, or the like.

In some embodiments, the trigger event at block B420 may refer to the $R_{txb}$ being greater or equal to the $R_{th}$ and the $MCS_{avg}$ is below the $MCS_{th}$. In other embodiments, the trigger event at block B420 may refer to either the $R_{txb}$ being greater or equal to the $R_{th}$ or the $MCS_{avg}$ is below the $MCS_{th}$. Alternative trigger events may include, but not limited to, simply detecting the activities of the first subscription (e.g., at block B410), detecting that the second subscription has or is expected to suffer blanking and/or power back-off, detecting that the second subscription has or is expected to suffer network penalties, and the like.

When the trigger event has not been detected (B420:NO), the scheduling module 230 may continue ongoing activities of the first and second subscriptions without further action, at block B410. The scheduling module 230 may periodically monitor various trigger events within additional throttling windows.

On the other hand, when the trigger event has been detected (B420:YES), the scheduling module 230 may throttle the BSR to refrain from requesting UL grants from the network (the second mobile network 104) for the second subscription, at block B430. At block B440, the scheduling module 230 may determine whether the first subscription activities have ended. In response to determining that the activities of the first subscription have not ended (B440: NO), the scheduling module 230 may continue to throttle the BSR at block B430. On the other hand, in response to determining that the activities of the first subscription have ended (B440:YES), the scheduling module 230 may transmit the full (or normal) BSR at block B450. Full BSR with normal UL requests may lead to the wireless communication device 200 having normal UL grants with high or the highest UL MCS and scheduling rate with no penalty from the second mobile network 104 or reduction in UL performance.

Figure 5:
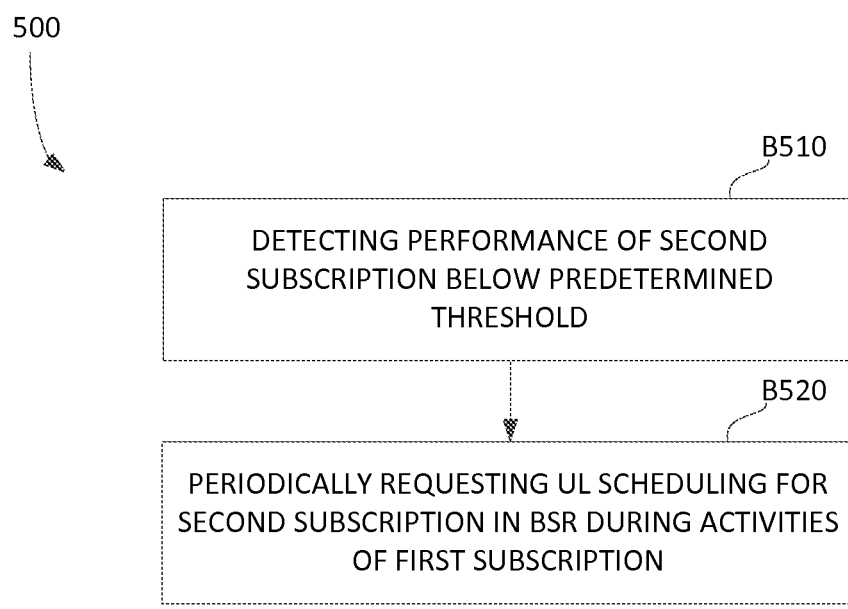
FIG. 5 is a process flowchart diagram illustrating an example of a scheduling method according to various embodiments.

FIG. 5 is a process flowchart diagram illustrating an example of a scheduling method 500 according to various embodiments. Referring to FIGS. 1-5, the scheduling method 500 may include further features of the scheduling method 400. At block B510, scheduling module 230 may detect performance of the second subscription being below a second predetermined threshold. For instance, block B510 may follow block B410. Such trigger may include, but not limited to, the $R_{txb}$ or the $MCS_{avg}$ determined at block B420 being beyond the second threshold.

Illustrating with a non-limiting example, the trigger may relate to the $R_{txb}$ being greater than 50%, 60%, 70%, or 80%. In another non-limiting example, the trigger may relate to the $MCS_{avg}$ being less than 7, 5, 4, or 3.

In response to detecting the trigger, the scheduling module 230 may periodically (e.g., but not limited to 5 ms, 10 ms, 15 ms, 20 ms, or the like) request UL scheduling for the second subscription (using the BSR) during (high-priority) activities of the first subscription at block B520. In particular, the scheduling module 230 may create windows by blanking the first subscription periodically to create gaps for the second subscription to transmit.

Figure 6A:
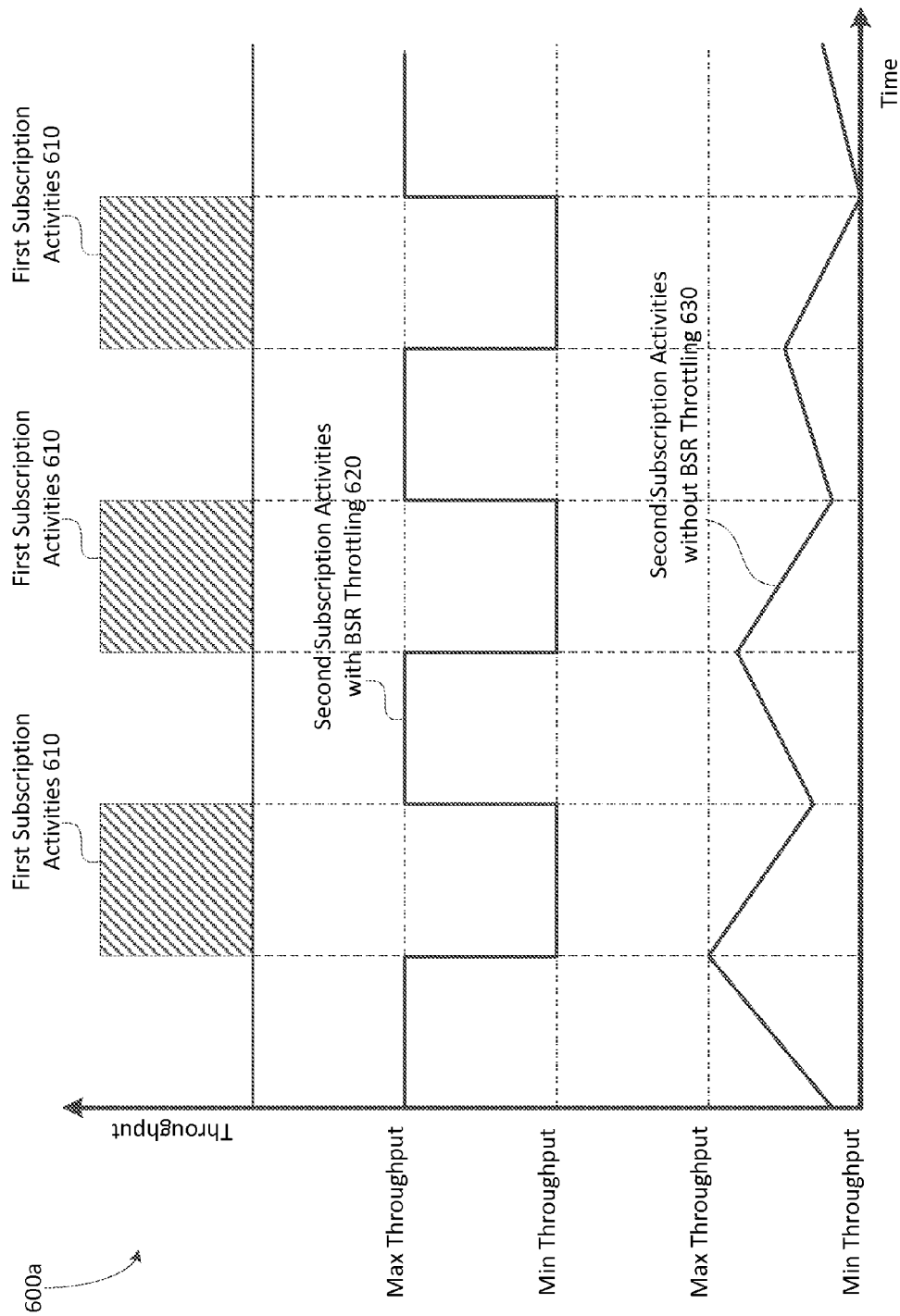
FIG. 6A is a diagram illustrating throughput of the second subscription according to various embodiments.

FIG. 6A is a diagram 600a illustrating throughput of the second subscription according to various embodiments. Referring to FIGS. 1-6A, BSR throttling may shape throughput of the second subscription activities with BSR throttling 620 as shown. In particular, the throughput diminishes to minimum in response to first subscription activities 610, as the scheduling module 230 does not request any UL grants from the second mobile network 104. In the absence of the first subscription activities 610, the throughput of the second subscription activities with BSR throttling 620 may be maintained at the maximum level, given that the wireless communication device 200 is not penalized by the second mobile network 104 for not transmitting at requested UL grants. On the other hand, the throughput of second subscription activities without BSR throttling 630 suffers network penalties as additional first subscription activities 610 hinder the transmission at requested UL grants.

Figure 6B:
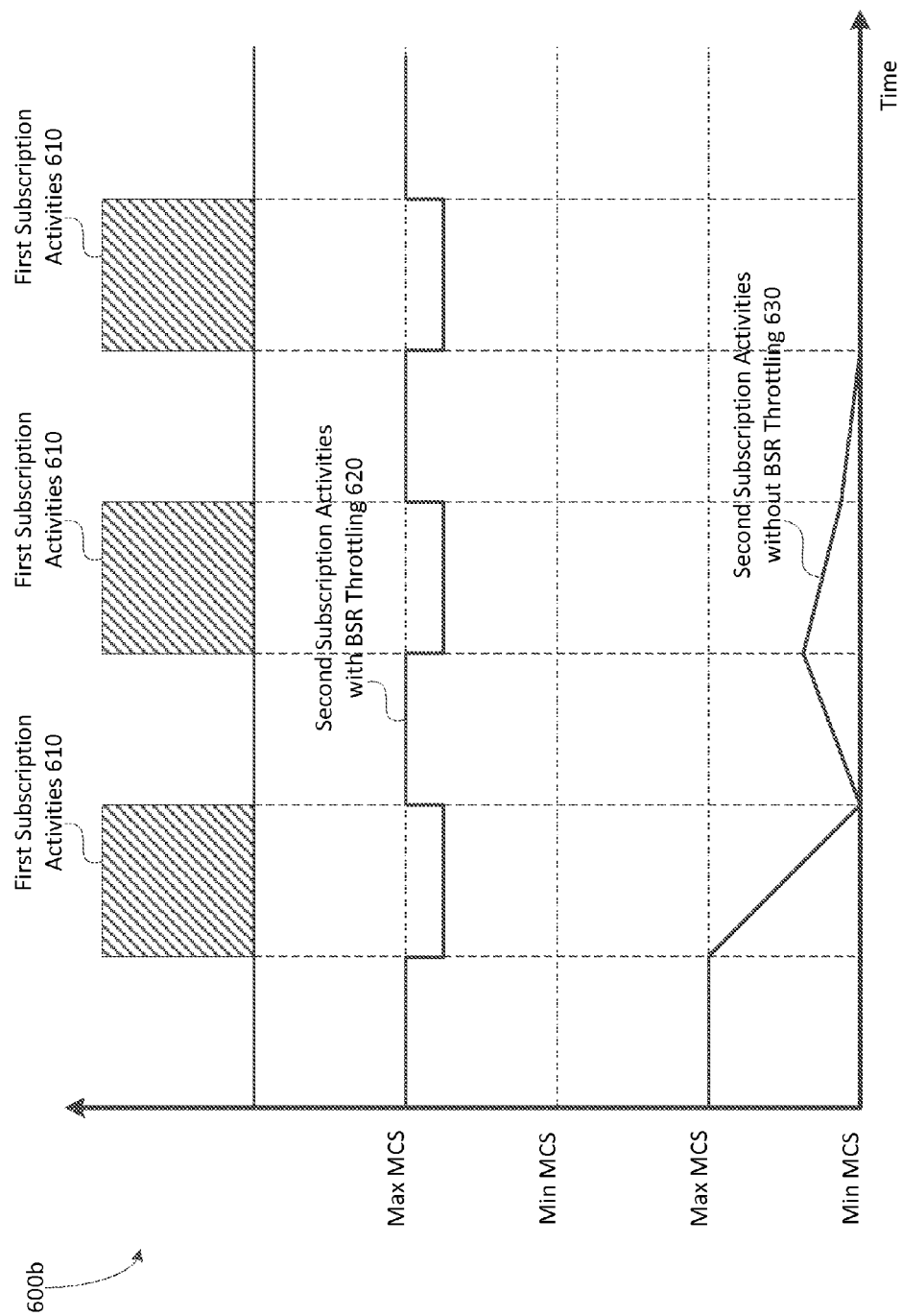
FIG. 6B is a diagram illustrating MCS associated with the second subscription according to various embodiments.

FIG. 6B is a diagram 600b illustrating MCS associated with the second subscription according to various embodiments. Referring to FIGS. 1-6B, wireless communication device to the first subscription activities 610, the MCS of the second subscription activities with BSR throttling 620 may decrease (e.g., for the throttling window). After the throttling window ends and that the scheduling module 230 detects decrease in MCS, BSR throttling would prevent further decrease of the MCS given that no UL grants are requested. Such a small or even insignificant decrease can allow quick MCS recovery to full MCS when the first subscription activities 610 end. On the other hand, the MCS of the second subscription activities without BSR throttling 630 experience significant decrease over the first subscription activities 610. This causes slow recovery to full MCS, as shown.

Accordingly, BSR throttling as described herein may reduce the degradation of the aggressor subscription by as much as, for example, 20%-50% depending on environmental factors.

Figure 7:
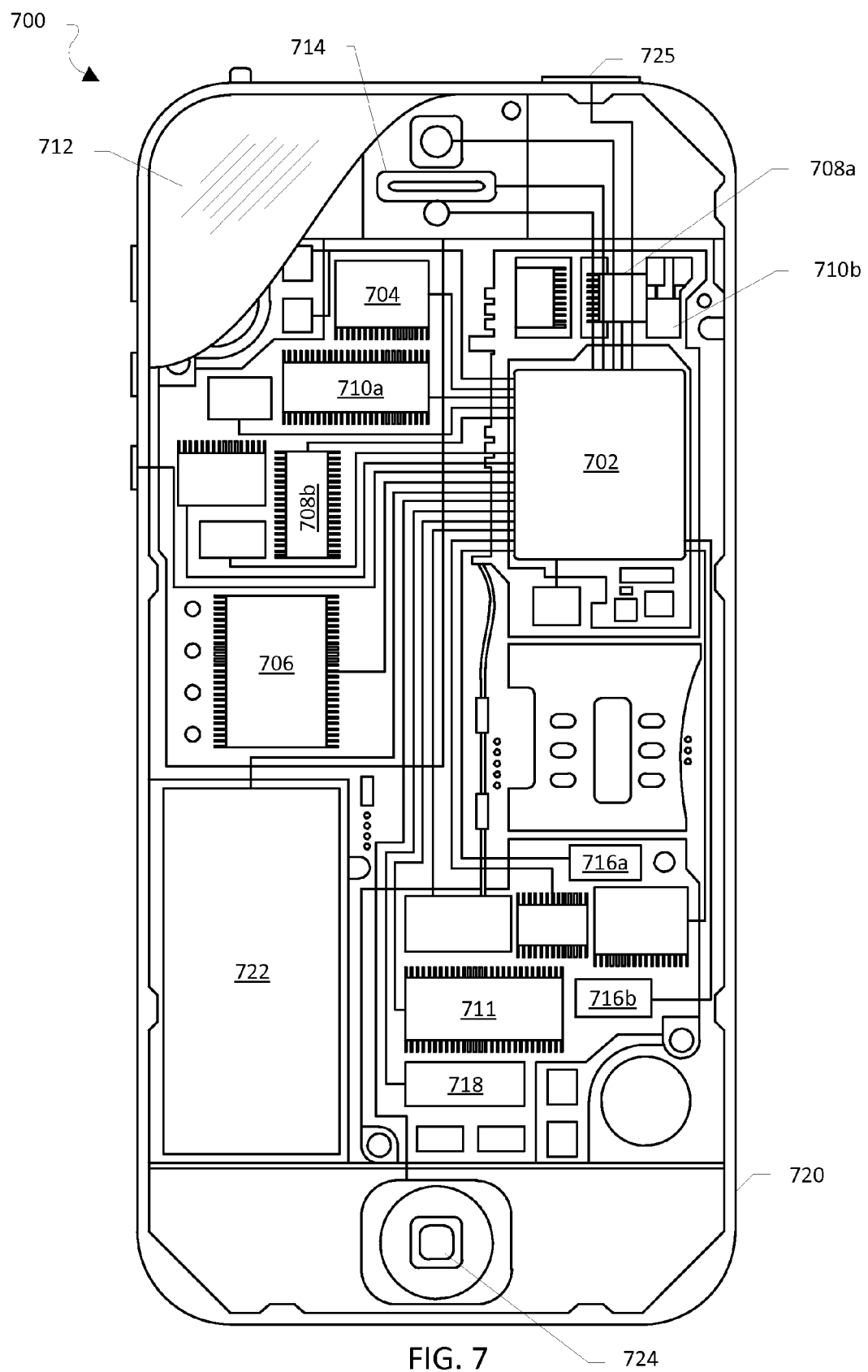
FIG. 7 is a component block diagram of a wireless communication device suitable for use with various embodiments.

The various embodiments may be implemented in any of a variety of wireless communication device, an example of which is illustrated in FIG. 7, as a wireless communication device 700 (which may correspond to the wireless communication devices 110, 200 in FIGS. 1-2). As such, the wireless communication device 700 may implement the process and/or the apparatus of FIGS. 1-6B, as described herein.

With reference to FIGS. 1-7, the wireless communication device 700 may include a processor 702 coupled to a touchscreen controller 704 and an internal memory 706. The processor 702 may be one or more multi-core integrated circuits designated for general or specific processing tasks. The memory 706 may be volatile or non-volatile memory, and may also be secure and/or encrypted memory, or unsecure and/or unencrypted memory, or any combination thereof. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the wireless communication device 700 need not have touch screen capability.

The wireless communication device 700 may have one or more cellular network transceivers 708a, 708b coupled to the processor 702 and to two or more antennas 710 and configured for sending and receiving cellular communications. The transceivers 708 and antennas 710a, 710b may be used with the above-mentioned circuitry to implement the various embodiment methods. The cellular network transceivers 708a, 708b may be the RF resources 218a, 218b. The antennas 710a, 710b may be the antennas 220a, 220b. The wireless communication device 700 may include two or more SIM cards 716a, 716b, corresponding to SIM-1 204a and SIM-2 204b, coupled to the transceivers 708a, 708b and/or the processor 702. The wireless communication device 700 may include a cellular network wireless modem chip 711 (e.g., the baseband modem processor 216) that enables communication via at least one cellular network and is coupled to the processor 702.

The wireless communication device 700 may include a peripheral device connection interface 718 coupled to the processor 702. The peripheral device connection interface 718 may be singularly configured to accept one type of connection, or multiply configured to accept various types of physical and communication connections, common or proprietary, such as USB, FireWire, Thunderbolt, or PCIe. The peripheral device connection interface 718 may also be coupled to a similarly configured peripheral device connection port (not shown).

The wireless communication device 700 may also include speakers 714 for providing audio outputs. The wireless communication device 700 may also include a housing 720, constructed of a plastic, metal, or a combination of materials, for containing all or some of the components discussed herein. The wireless communication device 700 may include a power source 722 coupled to the processor 702, such as a disposable or rechargeable battery. The rechargeable battery may also be coupled to a peripheral device connection port (not shown) to receive a charging current from a source external to the wireless communication device 700. The wireless communication device 700 may also include a physical button 724 for receiving user inputs. The wireless communication device 700 may also include a power button 726 for turning the wireless communication device 700 on and off.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for managing uplink communication activities of a wireless communication device associated with a first subscription and a second subscription, comprising:
   detecting a trigger event related to de-sensing of the first subscription by the second subscription, wherein the trigger event comprises at least one of a transmission blanking yield rate of the second subscription being above a first predetermined threshold or an average uplink (UL) Modulation Coding Scheme (MCS) for the second subscription being less than a second predetermined threshold; and
   transmitting a Buffer Status Report (BSR) to a network for the second subscription, wherein the BSR is throttled with respect to UL grants in response to detecting the trigger event.

2. The method of claim 1, wherein the transmission blanking yield rate is determined by dividing a number of blocks blanked by a number of blocks scheduled for a Physical uplink Shared Channel (PUSCH).

3. The method of claim 1, further comprising determining the transmission blanking yield rate for a predetermined throttling window.

4. The method of claim 3, wherein the BSR is transmitted after the predetermined throttling window closes.

5. The method of claim 1, wherein the average UL MCS for the second subscription being less than the second predetermined threshold is the trigger event when an average Reference Signal Received Power (RSRP) with respect to the second subscription is greater than a third predetermined threshold.

6. The method of claim 1, further comprising determining the average UL MCS for a predetermined throttling window.

7. The method of claim 6, wherein the BSR is transmitted after the predetermined throttling window closes.

8. The method of claim 1, wherein the BSR comprises at least one of a Signal Radio Bearer (SRB) signal, Non-Access Stratum (NAS) signal, or Acknowledgement (ACK)/Negative Acknowledgment (NACK) for Downlink (DL) Radio Link Control (RLC) and Transmission Control Protocol (TCP).

9. The method of claim 1, wherein activities of the first subscription have a higher priority than a priority of activities of the second subscription.

10. The method of claim 1, further comprising:
    determining whether activities of the first subscription have ended; and
    transmitting another BSR to the network for the second subscription in response to determining that the activities of the first subscription have ended, wherein the another BSR is normal.

11. The method of claim 1, further comprising:
    detecting that the transmission blanking yield rate of the second subscription is above the first predetermined threshold; and
    periodically requesting the UL grants for the second subscription using the BSR during activities of the first subscription when the transmission blanking yield rate of the second subscription is above the first predetermined threshold.

12. The method of claim 1, further comprising:
    detecting that the average UL MCS for the second subscription is less than the second predetermined threshold; and
    periodically requesting the UL grants for the second subscription using the BSR during activities of the first subscription when the average UL MCS for the second subscription is less than the second predetermined threshold.

13. The method of claim 1, wherein the BSR is throttled with respect to UL grants to refrain from requesting the UL grants.

14. The method of claim 1, wherein the BSR is throttled with respect to UL grants by reporting to the network that the wireless communication device has no data that needs to be transmitted using corresponding resources from the network.

15. A wireless communication device, comprising:
    at least one radio frequency (RF) resource;

a processor coupled to the at least one RF resource, configured to connect to a first Subscriber Identity Module (SIM) associated with a first subscription and to a second SIM associated with a second subscription, and configured with processor-executable instructions to:
   detect a trigger event related to de-sensing of the first subscription by the second subscription, wherein the trigger event comprises at least one of a transmission blanking yield rate of the second subscription being above a first predetermined threshold or an average UL Modulation Coding Scheme (MCS) for the second subscription being less than a second predetermined threshold; and
   transmit a Buffer Status Report (BSR) to a network for the second subscription, wherein the BSR is throttled with respect to UL grants in response to detecting the trigger event.

16. The wireless communication device of claim 15, wherein the processor is configured with processor-executable instructions to determine the transmission blanking yield rate by dividing a number of blocks blanked by a number of blocks scheduled for a Physical uplink Shared Channel (PUSCH).

17. The wireless communication device of claim 15, wherein the processor is configured with processor-executable instructions to determine the transmission blanking yield rate for a predetermined throttling window.

18. The wireless communication device of claim 15, wherein the processor is configured with processor-executable instructions to determine the average UL MCS for the second subscription being less than the second predetermined threshold by determining an average Reference Signal Received Power (RSRP) with respect to the second subscription is greater than a third predetermined threshold.

19. The wireless communication device of claim 15 wherein the processor is configured with processor-executable instructions to determine the average UL MCS for a predetermined throttling window.

20. The wireless communication device of claim 15, wherein the BSR comprises at least one of a Signal Radio Bearer (SRB) signal, Non-Access Stratum (NAS) signal, or Acknowledgement (ACK)/Negative Acknowledgment (NACK) for Downlink (DL) Radio Link Control (RLC) and Transmission Control Protocol (TCP).

21. The wireless communication device of claim 15, wherein activities of the first subscription have a higher priority than a priority of activities of the second subscription.

22. The wireless communication device of claim 15, wherein the processor is further configured with processor-executable instructions to:
   determine whether activities of the first subscription have ended; and
   transmit another BSR to the network for the second subscription in response to determining that the activities of the first subscription have ended, wherein the another BSR is normal.

23. The wireless communication device of claim 15, wherein the processor is further configured with processor-executable instructions to:
   detect that the transmission blanking yield rate of the second subscription is above the first predetermined threshold; and
   periodically request the UL grants for the second subscription using the BSR during activities of the first subscription when the transmission blanking yield rate of the second subscription is above the first predetermined threshold.

24. The wireless communication device of claim 15, wherein the processor is further configured with processor-executable instructions to:
   detect that the average UL MCS for the second subscription is less than the second predetermined threshold; and
   periodically request the UL grants for the second subscription using the BSR during activities of the first subscription when the average UL MCS for the second subscription is less than the second predetermined threshold.

25. A system for managing uplink communication activities of a wireless communication device associated with a first subscription and a second subscription, comprising:
   means for detecting a trigger event related to de-sensing of the first subscription by the second subscription, wherein the trigger event comprises at least one of a transmission blanking yield rate of the second subscription being above a first predetermined threshold or an average UL Modulation Coding Scheme (MCS) for the second subscription being less than a second predetermined threshold; and
   means for transmitting a Buffer Status Report (BSR) to a network for the second subscription, wherein the BSR is throttled with respect to UL grants in response to detecting the trigger event.

26. A non-transitory computer-readable medium containing computer-readable instructions such that, when executed, causes a processor of a wireless communication device to execute a method for managing uplink communication activities of the wireless communication device associated with a first subscription and a second subscription, the method comprising:
   detecting a trigger event related to de-sensing of the first subscription by the second subscription, wherein the trigger event comprises at least one of a transmission blanking yield rate of the second subscription being above a first predetermined threshold or an average UL Modulation Coding Scheme (MCS) for the second subscription being less than a second predetermined threshold; and
   transmitting a Buffer Status Report (BSR) to a network for the second subscription, wherein the BSR is throttled with respect to UL grants in response to detecting the trigger event.

* * * * *